Figure 1:
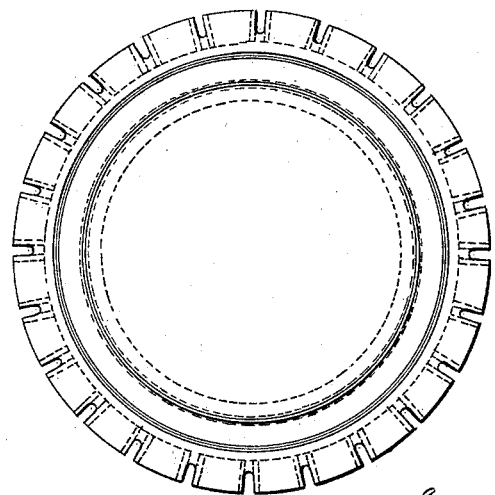

(No Model.)

T. M. SMITH.
PROCESS OF MAKING FERTILIZERS.

No. 474,419. Patented May 10, 1892.

Witnesses:

Inventor:
T. M. Smith

UNITED STATES PATENT OFFICE.

THOMAS MARSHALL SMITH, OF BALTIMORE, MARYLAND.

PROCESS OF MAKING FERTILIZERS.

SPECIFICATION forming part of Letters Patent No. 474,419, dated May 10, 1892.

Application filed May 16, 1891. Serial No. 392,999. (No specimens.)

*To all whom it may concern:*

Be it known that I, THOMAS MARSHALL SMITH, a citizen of the United States of America, residing at Baltimore, in the State of Maryland, have invented certain new and useful Improvements in Fertilizers, of which the following is a specification.

My invention relates particularly to the manufacture of fertilizers out of animal substances, such as leather scrap, hair, bones, muscles, and horn. These are the materials ordinarily used for such purposes; but my invention is also applicable to any animal substance, such as fish and substances of the same class.

The object of my invention is to secure in a product the greatest amount of ammonia and other valuable volatile ingredients, of which under the processes heretofore used a large proportion escapes. At the same time my object also is to reduce animal substances to a condition fit for application to the soil as fertilizer, this condition requiring that the substances shall be readily absorbed by the plants. To this end it is not only necessary that the substances should be in a finely-pulverized condition, but also that their organic texture should be destroyed. Heretofore such substances have been reduced to pulverized condition, or some at least, by grinding; but this does not destroy the organic texture and is in a greater or less degree (varying with the different substances) difficult to accomplish. Heretofore, also, such substances have been reduced to the liquid form by the application of heat with moisture. A fertilizer in the liquid form is impracticable to handle and to apply to the soil. If the liquid be evaporated down to a solid form, the evaporation at the same time carries off with the water all or a greater portion of the valuable volatile ingredients, including the most valuable, ammonia.

My invention consists in subjecting the animal substances to heat in a closed vessel in the presence of water or some equivalent liquid in a proportion to the amount of solid animal substance just sufficient to reduce the mass to a solid form or condition, which while hot is soft, but readily hardens and becomes friable when cool. This process being carried on in a closed vessel none of the volatile elements can escape. The animal substances being subjected to heat in the presence of water and the heat being of sufficient intensity and continued the proper length of time, as hereinafter explained, destroys the texture and reduces the mass to homogeneous form without decomposition. At the same time the amount of moisture remaining in the mass is so small that when the mass is removed from the vessel in which it is treated and exposed to the atmosphere and cooled it hardens and becomes friable. The amount of water which escapes being inconsiderable, the hardening is effected without any or with very slight loss of ammonia. In fact, after repeated chemical tests I have found that the amount of ammonia remaining in the dry material after the treatment above indicated is practically the same as that existing in the raw materials before the treatment. The vessel containing the animal substances and the water being tight there is no change in the amount of moisture contained therein during the heating. The steam applied in the jacket gradually brings up the temperature to the desired point.

My invention is not limited to any particular form of vessel in which the process is carried out and does not as herein claimed consist in any such vessel; but I have shown in the accompanying drawings a vessel suited to the purpose.

Figure 2:
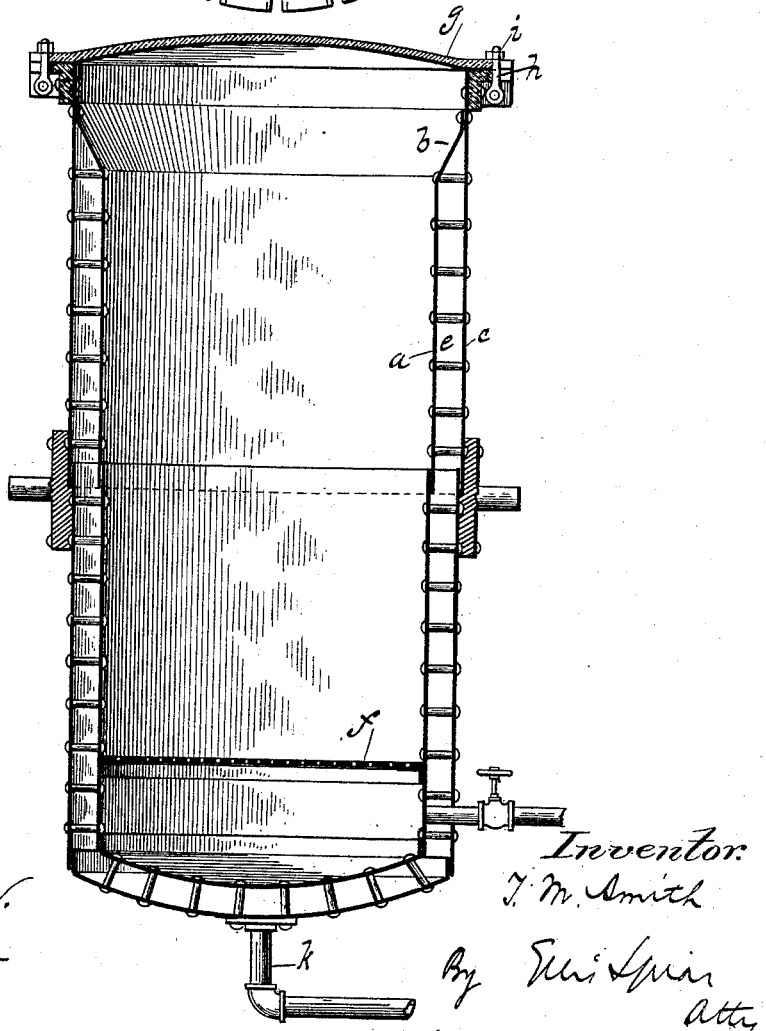

In the drawings, Figure 1 shows a plan view, and Fig. 2 a central vertical section, of a vessel suited to the process herein described.

In the figures, *a* represents the inner or main wall of the boiler. It has an upper flange *b* turned outwardly. About it is a jacket *c*, which leaves a steam-space *e*. Near the bottom of the boiler is a grate or perforated false bottom *f*. On the top is a steam-tight cover *g*, held down by hinged bolts *h*, having nuts *i*. A steam-pipe *k* from any suitable source of steam-supply leads into the steam-jacket. It being desirable for the best effect in the use of the invention to apply a higher degree of heat than that applied by steam at atmospheric pressure, the apparatus is designed for the application of steam in the jacket under a high pressure. Into this vessel or boiler I introduce the animal substance—for example, hair. If this substance is in ordinary condition, I first introduce into the boiler water under the perforated grate, the amount of water being just sufficient to convert the solid animal substances, when hot, into a soft but not liquid condition. The quantity of water necessary to reduce the substance depends upon the amount of moisture contained in said substance, which can be readily determined by skilled workmen. The material originally containing greater amount of moisture necessarily requires less water in the boiler. I have found that an amount equal to fifty gallons of water is sufficient for two thousand pounds of hair having six per cent. of moisture with hair. When substances to be heated in the vessel have in themselves a larger percentage of moisture, the amount placed under the perforated bottom is proportionally diminished. Slight variation would not materially affect the product, so long as the amount of water is not so great as to convert that product into a liquid on the one hand nor so little as to permit burning on the other. A liquid condition would require boiling in the open air in order to reduce it to a solid, and the boiling would expose by reason of the circulation thereby caused all the particles to the atmosphere, and would expel with the moisture the greater part of the volatile ingredients of the animal substances. Steam-pressure for the purpose above named of sixty to eighty pounds is sufficient to reduce the crude material to the required soft, solid, or pasty form in about twenty or thirty minutes. A higher pressure and heat may be used to hasten the process; but it must not be so high as to cause decomposition of the animal substances under treatment. When the substances have been treated as above explained, they are dumped upon the floor in a cohesive mass which will spread slightly and soon become cool and pulverable. A large percentage of water will remain latent in the hardened and friable product. The amount of water which escapes during the cooling and hardening is inconsiderable and of no effect in causing loss of ammonia as compared with the reduction of a similar liquid substance to a solid by evaporation. The final hardening process takes place as the substance cools, and, while there is some evaporation, the product becomes pulverable substantially without the aid of drying process.

I claim as my invention—

In the manufacture of fertilizers, the improvement which consists in first placing animal substances within a suitable vessel with a definite amount of water, sufficient only to reduce said materials to a soft or pasty mass while hot, and then closing said vessel and subjecting the contents thereof to the action of heat until the texture of the crude material has been destroyed and the material has been reduced to a mass soft while hot and brittle and pulverable substantially without further desiccation when cold, as and for the purpose set forth.

In testimony whereof I affix my signature in presence of two witnesses.

T. MARSHALL SMITH.

Witnesses:
PH. H. HOFFMAN,
N. CLARENCE ASHCOM.